May 6, 1941.    H. O. DROTNING    2,241,248
PHOTOGRAPHIC CAMERA
Filed Sept. 15, 1939
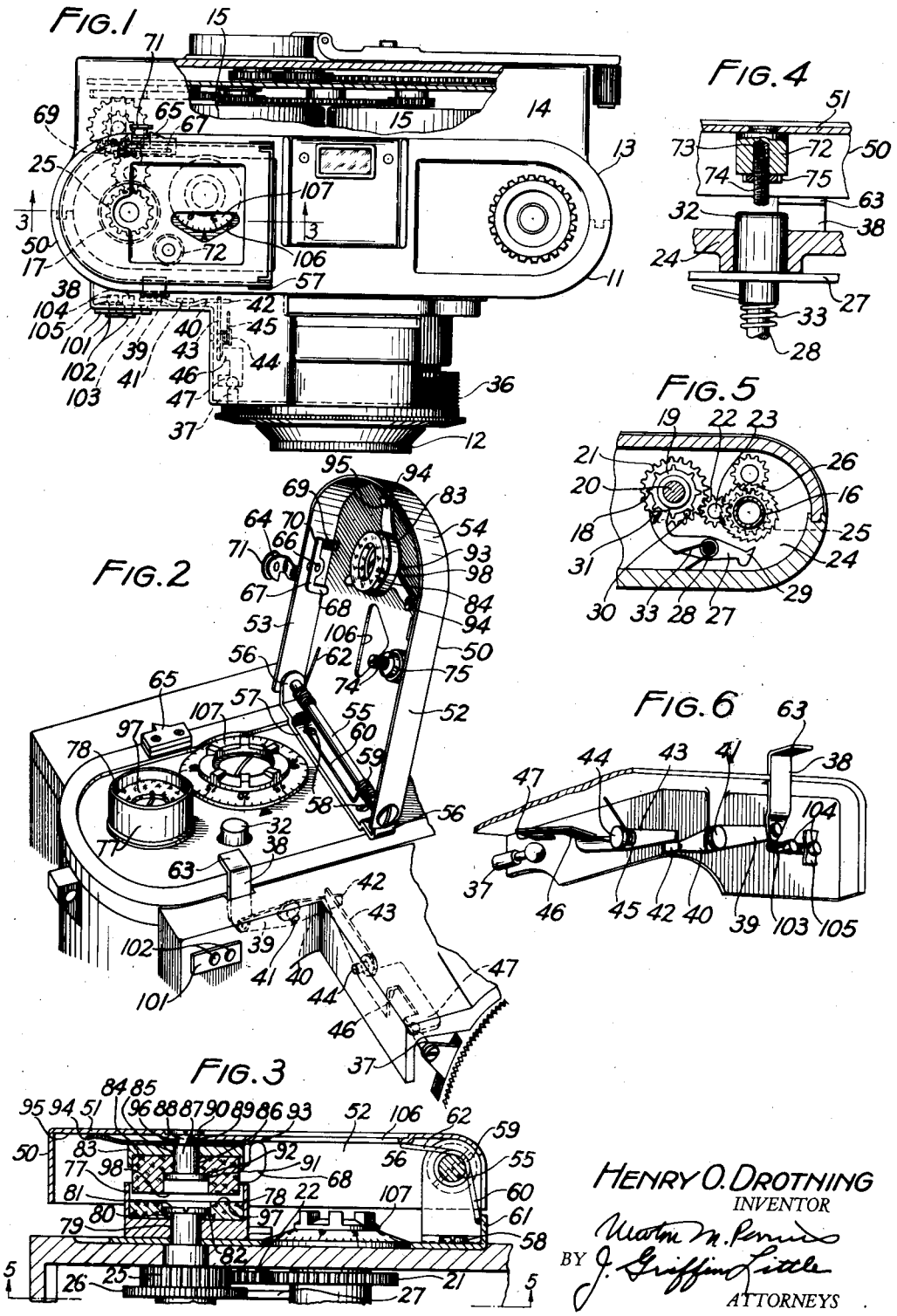
HENRY O. DROTNING
INVENTOR Patented May 6, 1941

2,241,248

UNITED STATES PATENT OFFICE 2,241,248

PHOTOGRAPHIC CAMERA

Henry O. Drotning, Rochester, N. Y., assignor to Eastman Kodak Company, Rochester, N. Y., a corporation of New Jersey Application September 15, 1939, Serial No. 295,076

10 Claims. (Cl. 95—31)

The present invention relates to photography, and more particularly to a camera in which a spring motor or other automatic means is connected to the takeup spool to rotate the latter to wind the exposed film thereon and to simultaneously move in unexposed film portion into exposing position.

One object of the invention is the provision of a member which is arranged to actuate both the shutter and the film releasing trigger in proper timed relation.

Another object of the invention is the provision of a member of the class described which may be selectively positioned to actuate both triggers in proper timed relation to make an instantaneous exposure, or moved to an inoperative position to permit independent action of the triggers to allow a time or delayed exposure to be made.

A further object is the provision of a trigger actuating member on which is mounted a clutch member or portion which is arranged to engage a complementary clutch portion on the takeup spindle prior to the release of the film trigger. This clutch prevents rotation of the windup spool when the film trigger is released, but is moved to disengage the clutch members upon release of the member to permit rotation of the windup spool.

A still further object of the invention is the provision of a single member formed with releases for the shutter and film release triggers, and a windup spindle holding means which is simple in construction, inexpensive to manufacture, effective in use, and which may be applied to existing cameras.

To these and other ends, the invention resides in certain improvements and combinations of parts, all as will be hereinafter more fully described, the novel features being pointed out in the claims at the end of the specification.

In the drawing:

Fig. 1 is a plan view of a spring wind camera of roll film type, with parts in section and parts in elevation, showing the relation thereto of a body release pad constructed in accordance with the present invention;

Fig. 2 is a perspective view of a portion of the camera illustrated in Fig. 1 but on a larger scale than the latter, showing the body release pad moved to an inoperative position in which the independent operation of the triggers may be secured, and further showing the relation of the various pad parts;

Fig. 3 is a vertical sectional view through a portion of the camera illustrated in Fig. 1, on a larger scale than the latter, and taken substantially on the line 3—3 of Fig. 1, showing the arrangement for holding the windup spindle against rotation;

Fig. 4 is a fragmentary sectional vieew of a portion of the mechanism illustrated in Fig. 2, showing the arrangement by which the film release trigger is actuated by the body release pad;

Fig. 5 is a horizontal sectional view taken substantially on line 5—5 of Fig. 3, showing the locking and releasing means for the windup spindle; and Fig. 6 is a perspective view of the connecting linkage between the shutter release member and the shutter trigger.

Similar reference numerals throughout the various views indicate the same parts.

The present invention relates to a camera of the roll film type in which a roll of miniature perforated film is arranged in a supply retort positioned at one end of the camera. The unexposed film strip is drawn from the retort and fed or intermittently shifted across the back of the camera after exposure, and finally wound up on a takeup roll or spool positioned at the opposite end of the camera. A feed sprocket is operatively connected to and driven from the takeup roll to cooperate therewith to shift the film. A spring motor, or other suitable motive means, is connected to and drives the takeup spindle with its takeup spool so that the shifting of the film is automatic, thus relieving the operator of the necessity of winding the film after each exposure.

Fig. 1 of the drawing shows a camera of the roll film type intended for use with miniature film. The camera comprises, broadly, a body portion 11 on the front of which is mounted the objective lens 12. The back of the camera is closed by a removable cover 13 to permit access to the interior of the camera. This cover 13 has secured thereto or formed integral therewith a case 14 in which are positioned a pair of spring motors, generally indicated by the numeral 15, and operatively connected to the windup spindle 16 by a suitable gear train. These spring motors and the driving connection to the windup spindle may be of any suitable well-known construction, such for example, as shown and described in the applicant's copending application Number 282,306, filed June 30, 1939, to which reference may be had for detailed description. As neither the spring motors nor the connection to the windup spindle constitute a part of the present invention, further detailed descriptions thereof are not deemed necessary to a full understanding of the present invention. A supply retort, not shown, is positioned at the right end of the camera, Fig. 1, and provides a supply of miniature marginal perforated film which is intermittently drawn or shifted across the camera by the spring motors 15. After the exposure is made, the film is wound up on the takeup spool 17 carried by the spindle 16. As the film strip moves across the camera, the marginal perforations thereof engage the teeth 18 of a feed sprocket 19 which is positioned just ahead and adjacent the takeup spool 17, as shown in Fig. 1.

The spring motors 15 are adapted to rotate the takeup spool 17 in a counter-clockwise direction, as viewed in Fig. 1, to wind the exposed film thereon. This rotation of the takeup spool is utilized to drive the film feed sprocket 19, which, in turn, controls a film measuring mechanism which alternately locks the takeup spool against further rotation after the film strip has been moved a distance of one image area, as will be later pointed out. To secure this result, the sprocket shaft 20 has mounted thereon a gear 21 which meshes with an idler gear 22 carried by a stub-shaft 23 supported in the camera wall 24. This idler gear, in turn, meshes with a gear 25 secured to and rotatable with the takeup spindle 16. The feed sprocket 19 is made of such a diameter that one revolution thereof will move one exposure image area of film across the camera. At the end of this movement, the windup spool and the feed sprocket are locked against further movement. This locking means comprises a ratchet 26 which is suitably secured to the spindle 16 and which lies in the path of a pawl 27 pivotally mounted on a shaft or stud 28 secured to the camera wall 24. The pawl 27 has one end thereof formed to provide a hooked locking member 29 which, when the pawl is rotated in a counter-clockwise direction, as viewed in Fig. 5, engages the ratchet 26 to lock the gear 25 and hence the takeup spindle and feed sprocket against further rotation, as will be apparent from an inspection of Fig. 5.

In order that this locking of the windup spool will occur in proper timed relation to the film movement, the operation of the pawl 27 is controlled by the feed sprocket 19. To this end, the gear 21 on the sprocket shaft is formed with a pin 30 which, when the sprocket has made one revolution, engages a lug 31 formed on the other end of the pawl 27 to pivot the pawl in a counter-clockwise direction about the stud 28, as viewed in Fig. 5, to bring the hook 29 into locking engagement with the ratchet 26. Thus upon each revolution of the feed sprocket 19, the windup spool 16 is locked, and as such revolution moves one image area, the locking of the take-up spool occurs when a new and unexposed portion of the film strip has been positioned in alignment with the lens 12. After the windup spool has been thus locked, the film strip is in position to make an exposure.

Upon completion of the exposure, the pawl 27 is then moved to an inoperative position to free the takeup spool so that the exposed film can be wound thereon. The pawl is thus moved by means of a button or film release trigger 32 which is spring pressed outwardly by means of a coil spring 33 which is wrapped around the stud 28 and is suitably secured to the pawl 27, in a manner shown in applicant's copending application Number 278,307, filed June 9, 1939, to which reference may be had for detailed showing. When the trigger 32 is pressed inwardly, the lug 31 is moved out of engagement with the pin 30 to free the pawl 27. The latter then moving in a clockwise direction under the action of spring 33 to move the hook 29 out of engagement with the ratchet 26. As the windup shaft is now free it may be rotated to wind the exposed film thereon. The above described locking means for the takeup spool, and the control therefor are clearly shown and described in the applicant's above-mentioned copending application Number 278,307, to which reference may be had for a more detailed description. As such mechanism does not constitute a part of the present invention a further discussion is not deemed necessary. A somewhat similar arrangement is also shown in the patent to Nelson, Number 2,150,696, to which reference may also be had. The spring motor drive and the film measuring and locking means do not constitute a part of the present invention except in so far as they cooperate with the body release pad to be later described.

The lens mount 36 of the objective lens 12 carries a shutter, not shown, of any suitable and well-known construction, which may be actuated by means of a release member 37 carried by the mount 36, as shown in Fig. 2 and is well known to those in the art. It is preferred, however, for reasons to be later pointed out, to operate the shutter from the camera body adjacent the film release trigger 32. To this end, a shutter trigger 38, of the shape best shown in Figs. 2 and 6, extends upwardly through the camera body adjacent the film trigger 32, as clearly shown in Fig. 2. This shutter trigger 38 is secured to and extends upwardly from one end 39 of a lever 40 which is pivoted at its mid point on a stud 41 secured to the camera body, see Fig. 6. The opposite end of the lever 40 is bent to form a lug 42 which engages one end of a lever 43, of the shape best shown in Figs. 2 and 6, pivoted at 44 on the camera body. A coil spring 45 is wrapped around the pivot 44 and has one end thereof engaging a portion 46 of the lever 43 while the other end engages the camera body and tends to rotate the lever 43 in a clockwise direction about the pivot 44, as viewed in Fig. 6, to hold the lever 43 in engagement with the lever 40, as is clearly apparent from an inspection of Fig. 6.

By means of this arrangement, the depressing of the shutter trigger 38 rotates the lever 40 in a clockwise direction about its pivot 41. Such movement, through the lug 42, moves the lever 43 in a counter-clockwise direction about its pivot 44 to move the left end 47 of the lever 43, see Fig. 6, into engagement with the shutter release member 37 to move the latter downwardly and thus operate the shutter. Thus the shutter may be actuated by merely depressing the shutter trigger 38 which is positioned adjacent the film release trigger 32.

It is apparent from the above description, that when an exposure is to be made, the shutter trigger 38 is first depressed to make the exposure, after which the film release trigger 32 is depressed to release or unlock the takeup spindle 16 so that the spring motors 15 may wind up the exposed film, and simultaneously move an unexposed film portion into exposing position. Thus the exposing of the film requires two separate and distinct operations. First, the operation of a shutter trigger 38 to make an exposure. Second, the actuation of the film release trigger 32 to release the spring motors to permit the film to be wound. These operations are performed in the order above named and must be in proper timed sequence. In other words, the film winding motors must not be released until the shutter actuation has been completed, the reasons for which are obvious to those in the art. In order to eliminate this dual operation, the present invention provides an arrangement in the form of a body release pad, generally indicated by the numeral 50, movably mounted on the camera body and arranged to engage, in a single operation, both the triggers 32 and 38 to concomitantly actuate the triggers in proper timed relation.

The body release pad is formed of any suitable material, preferably sheet metal, to provide a top 51 and spaced depending side members or walls 52 and 53 which are connected at one end by a curved wall portion 54, as clearly shown in Fig. 2. The sides 52 and 53 are rotatably mounted on the opposite ends of a pintle 55 which is supported in spaced bearings 56 formed on the bracket 57 secured to the camera body 11 by means of screws 58, or other suitable fastening means. Thus the pad 50 is pivotally mounted on the camera body for movement about the pintle 55. A coil spring 59 is wrapped around the pintle 55 and has the intermediate portion 60 adapted to engage a lug 61 on the camera body while the ends 62, only one of which is shown, engage the under side of the top 51 to turn the pad 50 about the pintle 55 to the inoperative position shown in Fig. 2, for a purpose to be later described.

In normal operation, the pad 50 is in the position shown in Figs. 1 and 3, in which the side wall 52 of the pad overlies and is positioned adjacent the inturned portion 63 of the shutter trigger 38. The pad is releasably held in its operative position by means of a latch 64 which is yieldably held in engagement with a catch 65 on the camera body, see Fig. 2. The latch 64 is secured to one end of a pin 66 which extends through the side wall 53 of the pad 50 and has secured to the inner end thereof an L-shaped member 67 one arm 68 of which engages the under side of the top 51 to act as a stop for the latch. A coil spring 69 is positioned between the pad 50 and the other arm 70 of the member 67 and tends to yieldably hold the latch 64 in engagement with the catch 65. The latch 64 may be disengaged from the catch 65 by means of a finger releasing portion 71. When so released, the pad 50 will automatically move, under the action of the spring 59, about the pintle 55 to the position shown in Fig. 2.

When the pad is in its operative position, shown in Figs. 1 and 3, the portion 63 of the shutter trigger 38 is positioned in the path of the side 52 of the body release pad so that when the latter is moved downwardly about its pivot 55, the side 52 will engage the portion 63. Further downward movement of the pad 50 will serve to depress the shutter trigger 38 to actuate the shutter, as is apparent. Thus the shutter may be actuated by merely depressing the pad 50 when in the operative position shown in Figs. 1 and 3. This movement of the pad 50 is also utilized to actuate the film release trigger 32. However, as pointed out above the trigger 32 is released after the trigger 38. To this end, the underside of the top 51 has secured thereto, in any suitable and well-known manner, a lug 72 formed with a threaded opening 73 adapted to receive an adjustable screw 74. This screw overlies the film release trigger 32 and is spaced therefrom, as shown in Fig. 4. The screw 74 is adjusted relative to the trigger 32 so that when the pad 50 is pressed downwardly to actuate the shutter trigger 38, as pointed out above, the screw 74 will not engage the film trigger 32 until after the shutter has been actuated. Then the continued downward movement of the pad will serve to depress the film trigger 32 to release the latter. The screw 74 is held in adjusted position by means of a lock nut 75, as shown in Figs. 2 and 4. By means of this arrangement, the shutter and film triggers are released by the single downward movement of the body release pad 50. In addition, the triggers are actuated in proper timed relation. Thus the previous double operation is replaced by a single operation, and, in addition, the possibility of incorrect operation is eliminated.

It is thus apparent from the above description, that the downward movement of the body release pad will actuate both triggers 32 and 38, and that these triggers will remain depressed as long as the pad 50 is held down. It is also apparent that if the film release trigger is retained in the depressed position, the pawl 27 will be held out of the path of the pin 30 so that the latter will be ineffective in moving the hook 29 into locking engagement with the ratchet 26 to arrest further winding of the takeup spool 17 when an image area is wound thereon. Thus the spring motors 15 will continue to wind the film onto the takeup spool 17 as long as the film trigger 32 is held depressed.

In order to prevent any such overwinding, the present invention provides a clutch which becomes operative upon depressing of the pad 50 to hold the spindle 16 against rotation as long as the pad is held in depressed position. This clutch engages slightly in advance of the releasing of trigger 32, and, after such release, provides the sole means of holding the spindle 16 against rotation by the spring motors 15. Upon release of the pad 50, the clutch members are disengaged, and the motors become effective to wind the film. However, when the pad 50 is released, the film release trigger is returned to normal position under the action of the spring 33 so as to move the pawl 27 into the path of the pin 30. Then when an image area of film has been wound, the pawl is automatically moved into locking engagement with the ratchet 26. By means of this clutch arrangement, the windup spindle 16 is held against rotation as long as the pad 50 is held down, but upon release of the latter the film is automatically wound onto the takeup spool, and such winding is automatically arrested when a new section of the film strip has been moved into exposing position.

This clutch comprises cooperating members on the spindle 16 and pad 50, the members being movable into engaging relation when the pad 50 is depressed, and being disengaged when the pad 50 is released. To secure this result, the spindle 16 extending through the camera body 11 below the pad 50, see Figs. 1, 2, and 3, has mounted thereon a cup-shaped member 77 in which is positioned a suitable friction clutch member or disk 78. The member 77 and disk 78 are provided with aligned openings 79 and 80 respectively through which the spindle 16 extends, see Fig. 3. The parts are held in assembled relation by means of a screw which is threaded into a registering opening in the end of the spindle 16 and has the head 81 thereof engaging a countersunk shoulder 82 formed in the opening 80. This screw thus serves to retain one of the clutch members to the spindle 16. The other clutch member is carried on the under side of the top 51, and comprises an inverted cup-shaped member 83 in which is positioned a friction disk 84. The member 83 and disk 84 are formed with aligned openings 85 and 86 through which a stud 87 extends, the latter being secured to the top 51 of the pad 50 in any suitable manner. In the present embodiment, the stud is formed with a reduced portion 88, which extends through an opening 89 of the top 51 and terminates in a head 90 to overlie the top surface of the pad 50, as shown in Fig. 3. The lower end of the stud 87 is formed with a head 91 which engages a countersunk shoulder 92 formed in the opening 86. A washer 93 is mounted on the reduced portion 88 of the stud 87 and is formed with radially extending resilient fingers 94 which engage the under surface 95 of the top 51 to resiliently mount the clutch member thereon. The washer 93 engages a shoulder 96 on the stud 87 and cooperates with the head 91 to retain the cup 83 and disk 84 in assembled relation, as is apparent from an inspection of Fig. 3.

By means of this arrangement, when the pad 50 is moved downwardly, the adjacent faces 97 and 98 of the friction disks 78 and 84 are brought into engaging relation to effectively hold the spindle 16 against rotation. This engagement occurs slightly in advance of the release of the film trigger 32, and upon such release, the clutch affords the only means of holding the spindle 16 against the action of the spring motor 15. As long as the pad 50 is held down, the clutch members are in engagement and the spindle 16 is held stationary. However, upon release of the pad 50, the spring 59 moves the pad upwardly in a clockwise direction about the pintle 55, as viewed in Fig. 3, to move the disk 83 out of engagement with the disk 78 and thus disengage the clutch members. As the film trigger 32 has been previously released, the spring motors now become effective to wind the film. When, however, an image area has been wound, the spindle 16 is again locked against further rotation.

The present invention thus provides a pivotally mounted body release pad which, when pressed downwardly, first releases the shutter trigger 38 to make the exposure. Continued downward movement of the pad engages the clutch members thereby preventing the spring motors from turning the takeup spool when the film trigger 38 is later released by further downward movement of the pad. Thus the mere depressing of the pad 50 actuates both triggers and engages the clutch members all in proper timed relation. It is thus apparent that by each actuation of the pad, an exposure is made and the film strip is moved the distance of one image area. However, in order to prevent inadvertent actuation of the pad 50, a suitable safety device is provided whereby the pad becomes ineffective to perform the above-described operation.

This safety device comprises, in the present embodiment, a small plate 101 slidably mounted on the front of the camera body 11, see Fig. 2. This plate carries a pair of pins 102 which extend through a slot 103 in the camera body. The inner ends of these pins are formed with enlarged heads 104 for obvious reasons. A spring 105 is positioned under one of the heads 104 to resiliently hold the plate 101 against camera body.

Upon inspection of Fig. 6, it will be apparent that if the plate 101 is slid to the left the enlarged head 104 of the left pin will be positioned under the shutter trigger 38 to prevent any downward movement thereof. With the pin in this position, the accidental depression of the pad 50 will not actuate the shutter trigger 38. As the film trigger 32 is released only after the releasing of the shutter trigger 38, and as the latter is locked by the head 104 of the pin 102, the accidental movement of the pad 50 will not shift the film. This simple, yet highly effective safety device, thus effectively prevents, when moved to its operative position, inadvertent making of an exposure and the subsequent moving of the film strip.

The pad 50 thus provides a simple mechanism for actuating both triggers in proper timed relation. However, each time the shutter trigger 38 is actuated the film trigger 32 is also operated. This arrangement is highly desirable in making an instantaneous exposure. However, in making a time exposure it is necessary to actuate the shutter trigger a second time before moving the film. Such an arrangement is not possible with the pad in its operative position, as shown in Figs. 1 and 3. In order to permit the making of such a time exposure, the latch 64 is released, and the pad 50, under the action of spring 59, automatically moves to an inoperative position, as shown in Fig. 2. In this position, the shutter and film triggers are disconnected so that the former may be double actuated to make a time exposure prior to the movement of the film strip. Various delayed exposures are also possible when the pad is in its inoperative position, as shown in Fig. 2. Thus the pad 50 may be selectively moved to its operative position to secure correct timed operation of the shutter and film triggers to make an instantaneous exposure, or may be moved to an inoperative position to permit the making of a time or delayed exposure.

The top 51 of the pad 50 is formed with a suitable opening 106 for viewing a counter 107 which is mounted on the camera body adjacent the film trigger and clutch. This counter may be connected to and operated from the film winding mechanism in any suitable and well-known manner, and such connection does not constitute any part of the present invention.

It is apparent from the above description that the present invention provides a simple, yet highly effective arrangement for actuating the shutter and film releasing triggers in proper timed relation. It is also apparent that this trigger operating member may be selectively positioned to actuate both triggers in the making of an instantaneous exposure, or may be moved to an inoperative position in which it is the disconnection from both triggers to permit the independent operation of the triggers for making a delayed or time exposure. This trigger operating member carries a clutch portion which engages a complementary portion on the windup spindle to hold the latter against rotation when the film release trigger is actuated.

While one embodiment of the invention has been disclosed, it is to be understood that the inventive idea may be carried out in a number of ways. This application is therefore not to be limited to the precise details disclosed, but is intended to cover all variations and modifications thereof falling within the spirit of the invention or the scope of the appended claims.

I claim:

1. In a roll film camera having a body portion, the combination with separate shutter and film releasing triggers mounted on and protruding from said body portion adjacent one end thereof, of a manually controlled body release pad pivotally mounted on said body portion adjacent said triggers, said pad being movable in one direction to engage said triggers to actuate the triggers in timed relation, and means engaging said pad to move the latter in the opposite direction about its pivot to normally retain said pad out of engagement with both of said triggers.

2. In a roll film camera having a body portion, the combination with separate shutter and film releasing triggers mounted on said body portion and having parts extending exteriorly of said body portion adjacent one end thereof, of a manually controlled body release pad pivotally mounted on said body portion and arranged to overlie said parts, means on said pad adapted to engage said shutter trigger part to actuate the latter, and separate adjustable means on said pad adapted to engage and actuate said film release trigger part subsequent to the actuation of the shutter trigger part.

3. In a roll film camera having a body portion, the combination with separate shutter and film releasing triggers mounted on said body portion adjacent one end thereof, of a manually controlled body release pad positioned on said body portion adjacent said triggers, said pad being movable in one direction to bring a portion thereof into engagement with said shutter trigger to actuate the latter, an adjustable member on said pad arranged to engage and actuate said film release trigger subsequent to the actuation of the shutter trigger, and means for moving said pad out of engagement with said triggers when said pad is released.

4. In a roll film camera having a body portion, the combination with separate shutter and film releasing triggers mounted on said body portion adjacent one end thereof, of a manually controlled pad pivotally mounted at one end on said body portion, releasable means for normally retaining said pad in operative position, said pad being manually movable in one direction to concomitantly engage said triggers to actuate said triggers in proper timed relation to make an instantaneous exposure, and a spring for moving said pad in the opposite direction and out of engagement with said triggers when said pad is released, said releasable means being movable to a disengaged position to allow said pad to be swung on its pivot to an inoperative position to permit independent operation of said triggers to allow time or delayed exposures to be made.

5. In a roll film camera having a body portion, the combination with separate shutter and film releasing triggers mounted on said body portion adjacent one end thereof, of a manually controlled pad formed to provide a top and depending side walls, a pintle carried by said body portion and engaging said side walls adjacent one end thereof to pivotally mount said pad on said body portion, a latch on one of said side walls arranged to engage a catch on said body portion to releasably retain said pad in operative position, said pad being manually movable in one direction to bring the other side wall into engagement with said shutter trigger to actuate the latter to make an instantaneous exposure, an adjusable screw carried by said top and arranged to engage said film release trigger subsequent to the actuation of said shutter trigger to actuate the film release trigger in timed relation to the actuation of the shutter trigger, and a coil spring carried by said pintle and engaging said top to move said pad in the opposite direction and out of engagement with said triggers when said pad is released, said latch in the engaged position serving to limit the movement of said pad in said opposite direction but when moved to the release position allowing said spring to swing said pad to an inoperative position to permit independent operation of said triggers to allow time or delayed exposures to be made.

6. In a roll film camera having a body portion, the combination with a take-up spindle rotatably mounted in one end of said body portion and carrying a take-up spool in which exposed film is wound, automatic means for rotating said spool, a film release trigger adjacent said spindle for controlling the release of said automatic means, of a shutter trigger mounted on said body portion adjacent said film release trigger, a manually controlled body release pad positioned on said body portion and movable to concomitantly engage and actuate said triggers, and means on said pad adapted to engage said spindle to control said automatic means independently of said film release trigger.

7. In a roll film camera having a body portion, the combination with a take-up spindle rotatably mounted in one end of said body portion and carrying a take-up spool in which exposed film is wound, automatic means for rotating said spool, a film release trigger adjacent said spindle for controlling the release of said automatic means, of a shutter trigger mounted on said body portion adjacent said film release trigger, a manually controlled body release pad positioned on said body portion and movable to first actuate said shutter trigger and to then release said film release trigger, cooperating clutch members on said pad and spindle movable into engaging relation prior to the release of said film trigger to prevent operation of the automatic means when said film trigger is released, and means for moving said clutch members out of engagement upon release of said pad to render said automatic means effective to rotate said spool.

8. In a roll film camera having a body portion, the combination with a take-up spindle rotatably mounted in one end of said body portion and carrying a take-up spool on which exposed film is wound, automatic means for rotating said spool, a film release trigger adjacent said spindle for releasing said automatic means, a shutter trigger mounted on said body portion adjacent said film trigger, said triggers having portions thereof extending through said body portion, of a manually controlled pad pivotally mounted on said body portion adjacent said one end, said pad being movable in one direction to concomitantly engage and release said shutter and film triggers in timed relation, a stationary clutch member carried by said spindle, a movable clutch member carried by said pad and arranged to engage said stationary member when said pad is moved in said one direction and prior to the release of said film trigger to prevent operation of said automatic means, and spring means for moving said pad in the opposite direction upon release thereof to move said movable clutch member out of engagement with said stationary member to release said automatic means.

9. In a roll film camera having a body portion, the combination with a take-up spindle rotatably mounted in one end of said body portion and carrying a take-up spool on which exposed film is wound, automatic means for rotating said spool, a film release trigger adjacent said spindle for releasing said automatic means, a shutter trigger mounted on said portion adjacent said film trigger, said triggers having portions thereof extending through said body portion, of a manually movable pad pivoted on said body portion and overlying said triggers but normally held out of engaging therewith, said pad being movable in one direction to first engage and actuate said shutter trigger to make an instantaneous exposure and to subsequently engage and release said film trigger, said spindle having a portion thereof extending through said body and positioned under said pad, a clutch member on said extending portion, a cooperating clutch member carried by said pad, said clutch member being adapted to be brought into cooperative engaging relation when said pad is moved in said one direction and prior to the release of the film trigger to prevent rotation of said spindle by said automatic means when said film trigger is released, said clutch members then providing the sole means for preventing operation of the automatic means, and a coil spring operatively connected to said pad to move the latter out of engagement with said triggers and to disengage said clutch member when said pad is released to permit operation of said automatic means, said pad being movable on its pivot to an inoperative position and out of overlying relation with said triggers to permit independent operation thereof to allow the making of a time or delayed exposure.

10. In a roll film camera having a body portion, the combination with a take-up spindle rotatably mounted in one end of said body portion and carrying a take-up spool on which exposed film is wound, automatic means for rotating said spool, a film release trigger adjacent said spindle for releasing said automatic means, a shutter trigger mounted on said portion adjacent said film trigger, said triggers having portions thereof extending through said body portion, of a manually movable pad pivoted on said body portion and overlying said triggers but normally held out of engaging therewith, separate means on said pad arranged to concomitantly engage and actuate said shutter and film releasing triggers in timed relation to make an instantaneous exposure when said pad is moved in one direction, a clutch member carried by said spindle, a complementary clutch member mounted on said pad, said clutch members being adapted to be brought into engaging relation when said pad is moved in said one direction and prior to the release of said film trigger to prevent rotation of said spindle by said automatic means when said film trigger is released, a coil spring carried by said body portion and engaging said pad to move the latter in the opposite direction and out of engagement with said triggers and to disengage said clutch members when said pad is released to permit said automatic means to rotate said spool, and a releasable catch for limiting movement of said pad in said opposite direction, said latch being releasable to permit said pad to be swung on its pivot to an inoperative position and out of overlying relation to said triggers to permit independent actuation of the latter to allow a time or delayed exposure to be made.

HENRY O. DROTNING.